United States Patent
Antona et al.

(10) Patent No.: US 7,440,662 B2
(45) Date of Patent: Oct. 21, 2008

(54) COMPENSATING FIBER FOR CUMULATED CHROMATIC DISPERSION AND CHROMATIC DISPERSION SLOPE

(75) Inventors: Jean-Christophe Antona, Montrouge (FR); Pierre Sillard, Le Chesnay (FR)

(73) Assignee: Draka Comteq B.V., Amsterdam (NL)

( * ) Notice: Subject to any disclaimer, the term of this patent is extended or adjusted under 35 U.S.C. 154(b) by 115 days.

(21) Appl. No.: 11/466,612

(22) Filed: Aug. 23, 2006

(65) Prior Publication Data

US 2007/0065081 A1    Mar. 22, 2007

(30) Foreign Application Priority Data

Sep. 20, 2005    (FR) .................................. 05 09577

(51) Int. Cl.
*G02B 6/00*    (2006.01)
(52) U.S. Cl. ...................................... 385/123; 385/126
(58) Field of Classification Search .................. None
See application file for complete search history.

(56) References Cited

U.S. PATENT DOCUMENTS

| 5,361,319 | A | 11/1994 | Antos et al. |
| 5,568,583 | A | 10/1996 | Akasaka et al. |
| 6,724,964 | B2 | 4/2004 | Lysiansky et al. |
| 6,993,228 | B2 * | 1/2006 | Burke et al. ................ 385/123 |
| 2002/0141716 | A1 | 10/2002 | Lysiansky et al. |
| 2002/0186946 | A1 | 12/2002 | Dong et al. |
| 2003/0202761 | A1 | 10/2003 | Ruilier et al. |

FOREIGN PATENT DOCUMENTS

| EP | 0668520 A2 | 8/1995 |
| EP | 1 067 412 A1 | 1/2001 |
| WO | 00/51268 A1 | 8/2000 |

* cited by examiner

*Primary Examiner*—Sung H Pak
(74) *Attorney, Agent, or Firm*—Sughrue Mion, PLLC

(57) ABSTRACT

A multimode fiber having an index profile such that, for a propagation mode other than the fundamental mode and at a wavelength of 1550 nm, the fiber presents a positive chromatic dispersion greater than or equal to 50 ps/run/km, a positive chromatic dispersion slope and a figure of merit (FOM) greater than or equal to 200 ps/run/dB.

12 Claims, 4 Drawing Sheets

COMPENSATING FIBER FOR CUMULATED CHROMATIC DISPERSION AND CHROMATIC DISPERSION SLOPE

BACKGROUND OF THE INVENTION

The present invention relates to the field of optical fiber transmission and more specifically to the compensation of cumulated chromatic dispersion and cumulated chromatic dispersion slope in optical fiber transmission systems.

For optical fibers, the index profile is generally qualified in relation to the graph of the function which associates the refractive index with the fiber radius. Conventionally the distance r to the center of the fiber is shown along the abscissa and the refractive index difference with the index of the fiber cladding is shown along the ordinate axis. The index profile is therefore referred to as "step", "trapezoidal" or "triangular" profile for graphs having the respective shapes of a step, trapezoid or triangle. These curves are generally representative of the theoretical or set profile of the fiber, the manufacturing stresses of the fiber possibly leading to a substantially different profile.

An optical fiber conventionally consists of an optical core whose function is to transmit and possibly to amplify an optical signal, and of an optical cladding whose function is to confine the optical signal within the core. For this purpose, the refractive indexes of the core $n_c$ and of the outer cladding $n_g$ are such that $n_c > n_g$. As is well known, the propagation of an optical signal in a single-mode optical fiber decomposes into a fundamental mode guided in the core and into secondary modes guided over a certain distance in the core-cladding assembly.

In new, high bit-rate, wavelength multiplexed transmission systems it is advantageous to manage chromatic dispersion, in particular for rates of 10 Gbits/s or higher. The objective, for all multiplex wavelength values, is to achieve a cumulated chromatic dispersion that is substantially zero on the link, in order to limit pulse broadening and resulting interference. "Cumulated chromatic dispersion" relates to the integral of local chromatic dispersion over fiber length; chromatic dispersion being constant, the cumulated chromatic dispersion is equal to the product of chromatic dispersion multiplied by the length of the fiber. A cumulated value of a few dozen ps/nm for dispersion is generally acceptable at 40 Gb/s, of a few hundred at 10 Gb/s. It is also of advantage, in the vicinity of the wavelengths used in the system, to avoid zero values of local chromatic dispersion for which non-linear effects are stronger. Finally, it is also of advantage to limit the cumulated chromatic dispersion slope over the multiplex range so as to avoid or limit distortions between the multiplex channels. This slope is conventionally the derivate of the local or cumulated chromatic dispersion with respect to the wavelength.

As line fibers, for optical fiber transmission systems, single-mode fibers are conventionally used (SMF) or Non-Zero Dispersion Shifted Fibers (NZDSF+). NZDSF+ fibers are fibers having a non-zero, positive chromatic dispersion for the wavelengths at which they are used, typically around 1550 nm. For these wavelengths, these fibers have low positive chromatic dispersion, typically lower than 10 ps/(nm.km) at 1550 nm, and a positive local chromatic dispersion slope of between 0.04 and 0.1 ps/(nm².km).

To compensate chromatic dispersion and chromatic dispersion slope in SMF or NZDSF+ fibers used as line fibers, short lengths of Dispersion Compensating Fiber can be used (DCF); said fiber then has a negative chromatic dispersion and a negative chromatic dispersion slope. For the choice of DCF fiber, it is generally sought that the ratio of chromatic dispersion over the dispersion slope of the compensating fiber is substantially equal to that of the line fiber. This ratio is designated by the abbreviation DOS for Dispersion Over Slope ratio.

U.S. Pat. No. 5,568,583 or U.S. Pat. No. 5,361,319 describe DCF fibers for compensating the chromatic dispersion of SMF fibers, and EP-A-1 067 412 describes a DCF fiber for compensating the chromatic dispersion of NZDSF fibers. These known DCF fibers, at a wavelength of 1550 nm, exhibit a negative chromatic dispersion and a negative chromatic dispersion slope.

Optical systems that are wavelength multiplexed, called Wavelength Division Multiplexing (WDM), generally consist of a concatenation of line fiber sections—SMF, NZDSF or other—with dispersion compensation modules inserted between the line fiber sections and comprising DCF rolled sections. The manner in which the dispersion compensation modules are distributed along the transmission line is called dispersion management; the objective of this management is to limit both non-linear effects and cumulated end-of-line dispersion. It is always sought, at the end of the line, to achieve a low cumulated chromatic dispersion and a zero cumulated dispersion slope.

In this context, by "transmission line section" is meant part of an optical transmission system linking a transmitting element to a receiving element, these elements possibly being located at the end of the line or in nodes of the optical system. A line section therefore comprises one or more concatenated line fiber sections and one or more sections of dispersion compensating fiber distributed between the sections of the line fiber. The line fiber sections usually generate positive chromatic dispersion with a positive chromatic dispersion slope, whereas sections of compensating fiber generate negative chromatic dispersion with a negative chromatic dispersion slope. In the event of overcompensation, the line section will therefore exhibit negative cumulated chromatic dispersion and negative chromatic dispersion slope which it is necessary to offset in order to arrive at zero dispersion at a node entry or at the end of the line.

It is sometimes of advantage to insert overcompensation along the transmission line, for example to limit non-linear effects in the line fiber. It has also been found that overcompensation of chromatic dispersion reduces the error rate at the receivers. For example, the article 'Investigation of Advanced Dispersion Management Techniques for Ultra-Long Haul Transmissions" by J.-C Antona, M. Lefrancois, S. Bigo and G. Le Meur, presented in September 2005 to the ECOC'05 Conference (European Conference for Optical Communications) indicates that over-compensation during transmission, illustrated in the article by a residual dispersion per subdivision or per negative line fiber section, makes it possible to improve the performance of WDM systems at 10 Gb/s. However, at line end and/or at each node of the transmission system, the cumulated chromatic dispersion must be restored to zero or slightly positive. Yet, if the optical signal has been overcompensated, at the end of the line, the chromatic dispersion and the dispersion slope will be negative; it is then necessary, in order to offset this overcompensation, to use a fiber end having positive dispersion and a positive dispersion slope. For this purpose, sections of Standard SMF fibers are often used (SSMF) or Pure Silica Core Fibers (PSCF).

The major drawback with the use of a SSMF section to offset over-compensation is that SSMF induces high losses with respect to the quantity of dispersion produced. This characteristic is generally determined by what is called the "Figure of Merit" (FOM). FOM is defined as the ratio of chromatic dispersion D, in absolute value, to the attenuation of the signal in dB/km. For a SSMF fiber, the FOM value is in the order of 85 ps/nm/dB. PSCF fibers induce fewer optical losses and have a FOM value in the order of 125 ps/nm/dB, but they are costly.

U.S. Pat. No. 6,724,964 describes optical fibers having index profiles such that the fibers, for a high order propagation mode, exhibit positive chromatic dispersion. The profiles described in this application generate positive chromatic dispersion and a positive, zero or negative dispersion slope. The fibers described in this document are used to compensate the dispersion of line fibers having negative chromatic dispersion. The dispersion values of the described fibers are very high, in the order of 500 ps/nm/km at 1550 nm. In addition, the fibers described in this document do not exhibit a positive chromatic dispersion slope over the entire spectral band used; in particular at 1550 nm, the dispersion slopes of the illustrated fibers are all negative. The fibers described in U.S. Pat. No. 6,724,964 could not be used therefore to counter overcompensation of a line section having negative cumulated chromatic dispersion and negative chromatic dispersion slope.

U.S. Pat. No. 2003/0202761 describes a fiber which, for a propagation mode other than the fundamental mode, exhibits a positive chromatic dispersion and a negative chromatic dispersion slope. This compensation fiber is particularly suitable for compensating a line fiber having a negative chromatic dispersion with a positive chromatic dispersion slope, such as the fiber marketed by Corning under the trade name Corning LS®. The fiber described in U.S. Pat. No. 2003/0202761 is therefore not adapted for offsetting overcompensation of a line section having negative cumulated chromatic dispersion and negative chromatic dispersion slope.

There is therefore a need for a chromatic dispersion compensating fiber with which it is possible to offset overcompensation at the end of the line or on node entry in an optical system, and which has a FOM factor that is higher than that of a SSMF or PSCF fiber.

SUMMARY OF THE INVENTION

For this purpose, the invention proposes the use of a slightly multimode fiber which, for a propagation mode other than the fundamental mode, exhibits positive chromatic dispersion and positive chromatic dispersion slope with a Figure of Merit that is greater than 200 ps/nm/dB.

More particularly, the invention proposes a multimode optical fiber whose index profile is such that, for a propagation mode other than the fundamental mode and at a wavelength of 1550 nm, the fiber exhibits:

a positive chromatic dispersion of 50 ps/nm/km or over,
a positive chromatic dispersion slope
a Figure of Merit (FOM) of 200 ps/nm/dB or over.

According to embodiments, the fiber of the invention may have one or more of the following characteristics:

a Dispersion Over Slope ratio (DOS) of 40 nm or over, for a high order propagation mode at a wavelength of 1550 nm.
a positive chromatic dispersion of 150 ps/nm/km or over, for a high order propagation mode at a wavelength of 1550 nm,
a positive chromatic dispersion slope over the entire spectral band used, for a high order propagation mode; the spectral band may be chosen from the C band, L band, S band or U band.
an effective surface area of 100 μm² or over, for a high order propagation mode at a wavelength of 1550 nm.

an effective cut-off wavelength of more than 2000 nm for the $LP_{02}$ mode.

The invention also concerns a chromatic dispersion compensating module adapted to offset overcompensation of an optical signal propagating in fundamental mode in a transmission line section comprising a line fiber with positive chromatic dispersion and positive chromatic dispersion slope, the module comprising:

a first mode converter, adapted to convert the fundamental mode into a higher order mode;
a multimode fiber section of the invention,
a second mode converter adapted to convert the higher order mode into fundamental mode.

Depending upon embodiments, the dispersion compensating module of the invention has one or more of the following characteristics:

the Dispersion Over Slope ratio (DOS) of the multimode fiber is substantially equal to the Dispersion Over Slope ratio (DOS) of the transmission line fiber,
the higher order mode has the same symmetry as the fundamental mode;
a Figure of Merit (FOM) of 150 ps/nm/dB or over for cumulated dispersion in the fiber section of 800 ps/nm or over.

The invention also concerns an optical transmission system having:

at least one optical signal transmitter in a predetermined spectral band;
at least one transmission line section having negative cumulated chromatic dispersion and negative chromatic dispersion slope;
at least one module of the invention positioned at one end of the transmission line section.

According to one characteristic, the transmission line section comprises at least one line fiber section having positive chromatic dispersion and a positive chromatic dispersion slope, and at least one dispersion compensating fiber section having negative chromatic dispersion and a negative chromatic dispersion slope.

BRIEF DESCRIPTION OF THE DRAWINGS

Other characteristics and advantages of the invention will become apparent on reading the following description of embodiments of the invention, given by way of example and with reference to the appended drawings in which.

DETAILED DESCRIPTION OF THE INVENTION

To offset the overcompensation of cumulated chromatic dispersion and chromatic dispersion slope in an optical transmission line section without incurring high losses, the invention proposes the use of a multimode compensating optical fiber having a particular index profile. Since overcompensation leads to negative cumulated chromatic dispersion and negative cumulated chromatic dispersion slope at the end of the line, the inventive fiber, for a high order mode, exhibits positive chromatic dispersion and positive chromatic dispersion slope with a Figure of Merit of more than 200 ps/nm/dB.

The fact that the dispersion compensating fiber is used in a transmission mode other than the fundamental mode, makes it possible for the fiber, at the wavelengths under consideration, to exhibit positive chromatic dispersion and positive chromatic dispersion slope with a high Figure of Merit.

Figure 1:
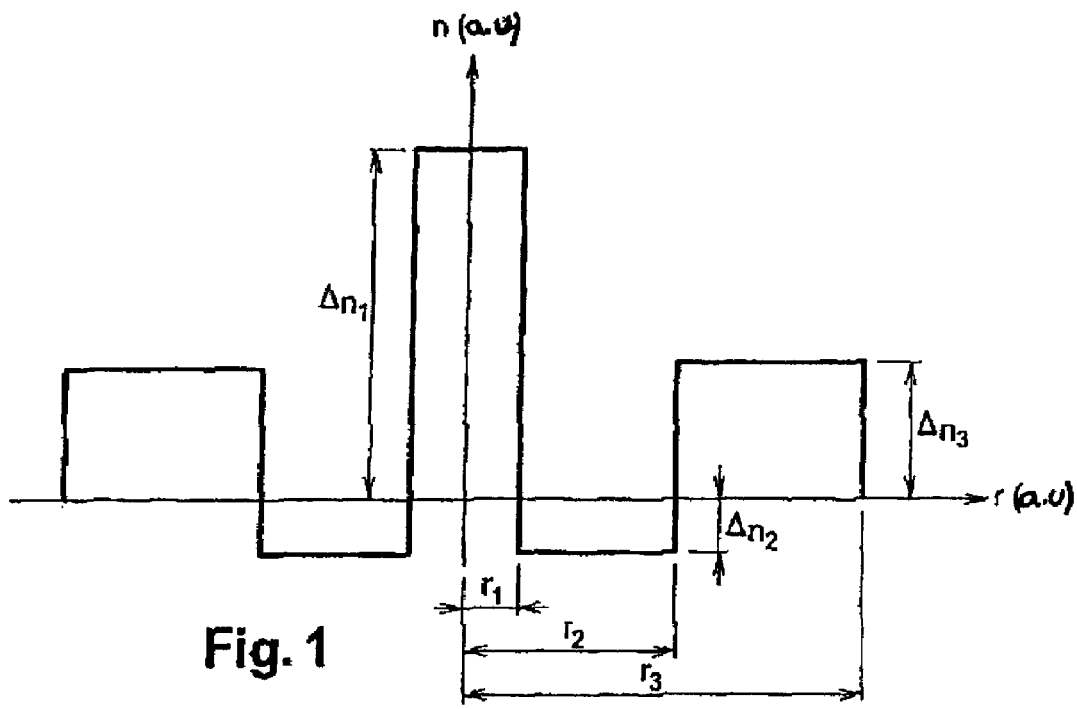
FIG. 1, a schematic graph of a possible set profile for a dispersion compensating fiber of the invention.

FIG. 1 illustrates an index profile for a dispersion compensating fiber of the invention. The illustrated profile is a set profile, i.e. representing the theoretical profile of the fiber, the fiber actually obtained after fiber-drawing from a preform possibly having a substantially different profile. In addition, although not illustrated, other index profiles may be contemplated for a fiber of the invention—which are given in the table given below. In particular, the inventive fiber may have more than three layers in the core and/or not have a depressed ring.

The compensating fiber of the invention comprises a central core having a positive index difference $\Delta n_1$ with an outer optical cladding, a first inner cladding exhibiting a positive or negative index difference $\Delta n_2$ with the outer cladding and a ring having a positive index difference $\Delta n_3$ with the outer cladding. It is recalled that the outer cladding is the optical cladding $n_g$ defined previously.

FIG. 1 shows an index profile with core layers in step form; the central core could be of trapezoid shape however, or meet an alpha function.

Figure 3:
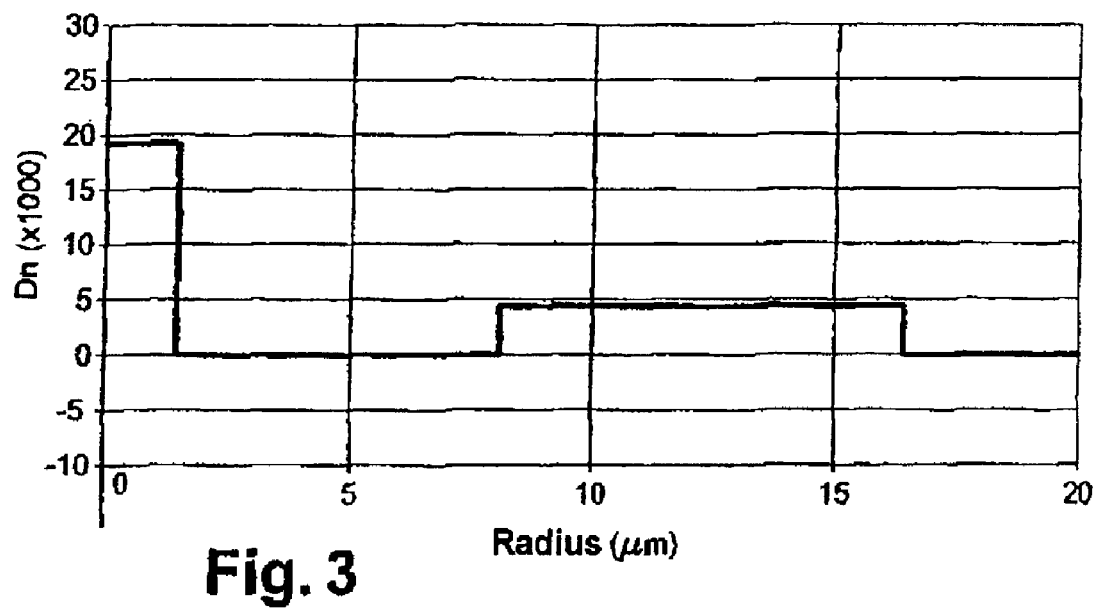
Figure 5:
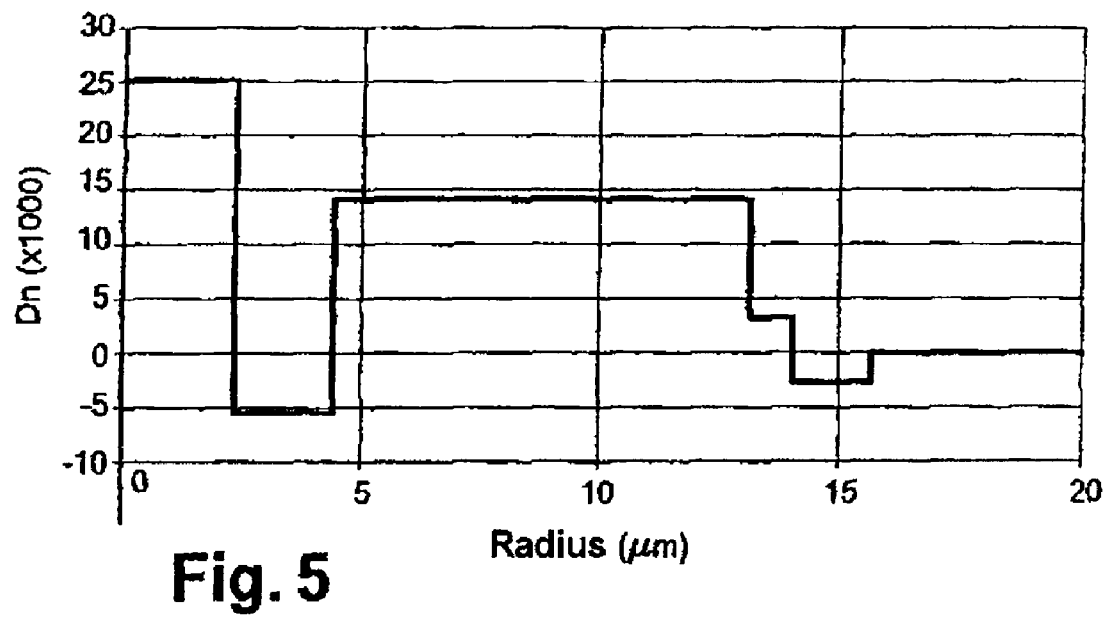
FIG. 5, a graph showing the set profile of a dispersion compensating fiber according to a second example of embodiment of the invention, FIG. 6, a curve showing the chromatic dispersion on band C of the fiber in FIG. 5.
Figure 7:
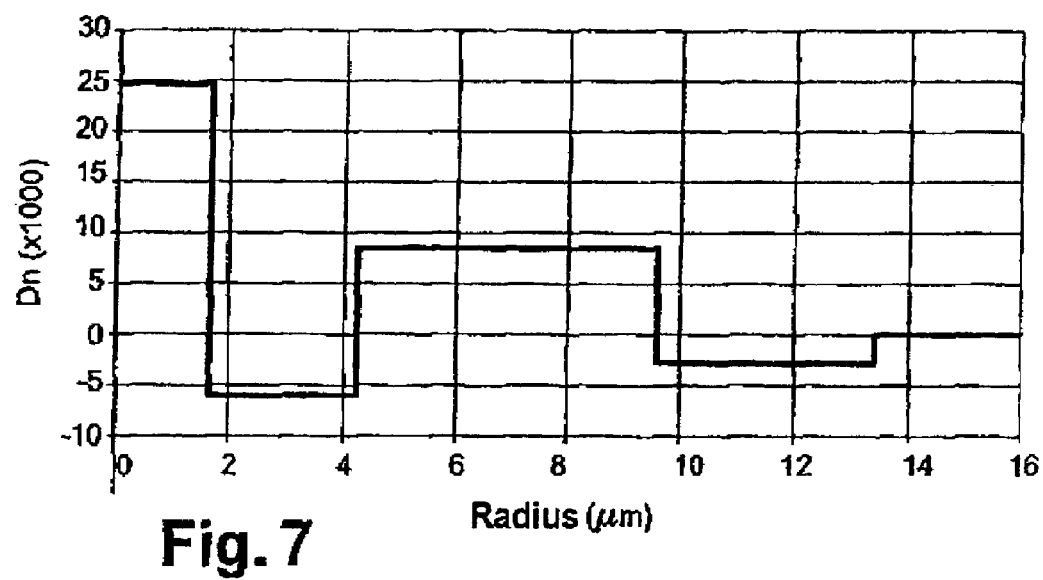
FIG. 7, a graph showing the set profile of a dispersion compensating fiber according to a third example of embodiment of the invention, FIG. 8, a curve showing the chromatic dispersion on band C of the fiber in FIG. 7.

Table I below illustrates the characteristics of several possible index profiles for a compensating fiber of the invention. The first column allocates a reference to each simulated fiber and the following columns successively indicate the radii values and index differences of each section. The relative index values are measured at the wavelength of 633 nm. FIGS. 3, 5 and 7 show the set index profiles of the fibers in examples 1, 4 and 7 of Table I.

The inventive compensating fiber, having an index profile such as described above, and for a propagation mode other than the fundamental mode, exhibits positive chromatic dispersion and a positive chromatic dispersion slope adapted to offset overcompensation of an optical transmission line section having negative cumulated chromatic dispersion and negative cumulated chromatic dispersion slope. Therefore, the inventive fiber, for a high order propagation mode and at a wavelength of 1550 nm, exhibits a positive chromatic dispersion of 50 ps/nm/km or more with a positive chromatic dispersion slope and a Figure of Merit (FOM) of 200 ps/nm/dB or more. More specifically, the inventive fiber may exhibit positive chromatic dispersion of 150 ps/nm/km or over at 1550 nm and a positive chromatic dispersion slope over the entire spectral band under consideration; it is therefore adapted so that it can, with fewer losses, fully offset overcompensation inserted in the transmission line by dispersion management intended to reduce non-linear effects.

The high order propagation mode may be the $LP_{02}$ mode, the $LP_{03}$ mode or any other high order mode greater than $LP_{01}$ which preferably has the same symmetry, circular for example, as the fundamental $LP_{01}$ mode in order to limit losses induced by mode converters and polarization effects due to faults in the circular geometry of the fiber. But other higher order modes may be considered such as the $LP_{11}$ mode.

The spectral band under consideration may be the C band extending from 1530 nm to 1565 nm, or the L band extending from 1565 nm to 1625 nm. The C and L bands are the most frequently used spectral bands in optical transmission systems, but other spectral bands may be used such as the S band extending from 1460 nm to 1530 nm, or the U band extending from 1625 nm to 1675 nm.

In addition, the optical fiber of the invention has a Dispersion Over Slope ratio of 450 nm or more at a wavelength of 1550 nm. The DOS ratio of the inventive fiber is chosen to be as near as possible to the DOS of the transmission line fiber in order to reach substantially zero dispersion and dispersion slope values at the end of the line section, i.e. at the entry into a receiver or node of an optical system. Said DOS value of 40 nm or over at a wavelength of 1550 nm makes it possible to offset over compensation in most transmission line sections such as defined above.

Table II below illustrates the optical characteristics of compensating fibers corresponding to the index profiles in Table I. The first column reproduces the references of the first column in Table I. The following columns, for each simulated fiber profile, give the chromatic dispersion value D and chromatic dispersion slope value D', the DOS values, the effective sur-

TABLE I

| Fiber | $r_1$ (μm) | $\Delta n_1$ ($10^{-3}$) | $r_2$ (μm) | $\Delta n_2$ ($10^{-3}$) | $r_3$ (μm) | $\Delta n_3$ ($10^{-3}$) | $r_4$ (μm) | $\Delta n_4$ ($10^{-3}$) | $r_5$ (μm) | $\Delta n_5$ ($10^{-3}$) |
|---|---|---|---|---|---|---|---|---|---|---|
| 0 | 1.69 | 20.2 | 8.40 | 0.4 | 12.98 | 8.4 | 16.39 | 4.1 | | |
| 1 | 1.48 | 19.1 | 8.10 | 0.0 | 16.34 | 4.5 | | | | |
| 2 | 2.46 | 25.0 | 4.60 | −6.0 | 14.11 | 15.0 | | | | |
| 3 | 1.38 | 20.0 | 7.48 | 0.1 | 18.00 | 3.8 | | | | |
| 4 | 2.27 | 25.2 | 4.38 | −5.5 | 13.11 | 14.2 | 14.00 | 3.0 | 15.61 | −3.0 |
| 5 | 1.49 | 19.1 | 7.55 | 0.0 | 16.17 | 4.5 | | | | |
| 6 | 2.04 | 19.4 | 6.50 | 0.1 | 12.68 | 9.8 | | | | |
| 7 | 1.61 | 24.7 | 4.24 | −6.0 | 9.57 | 8.2 | 13.38 | −3.0 | | |
| 8 | 1.39 | 19.9 | 11.00 | 0.3 | 13.90 | 8.0 | | | | | face area values $A_{eff}$, the effective cut-off wavelength $\lambda c_{eff\text{-}02}$ for the high order propagation mode greater than $LP_{02}$ and the of Merit FOM.

The values of chromatic dispersion D, chromatic dispersion slope D', DOS, FOM and effective surface area $A_{eff}$ are given for the propagation mode $LP_{02}$ at a wavelength of 1550 nm. The effective cut-off wavelength $\lambda c_{\it{eff-02}}$ corresponds to the wavelength on and after which the optical signal propagating in $LP_{02}$ mode is no longer guided after propagation over two meters of fiber. The Figure of Merit is defined as the ratio of chromatic dispersion D over signal attenuation in dB/km; the FOM values are given for the propagation mode $LP_{02}$ at a wavelength of 1550 nm.

TABLE II

| Fiber | D (ps/nm/km) | D' (ps/nm²/km) | DOS (nm) | $A_{\it{eff}}$ (µm²) | $\lambda c_{\it{eff-02}}$ (nm) | FOM (ps/nm/dB) |
|---|---|---|---|---|---|---|
| 0 | 315 | 6.30 | 50 | 220 | 2400 | >500 |
| 1 | 180 | 2.77 | 65 | 380 | 2100 | >300 |
| 2 | 200 | 2.86 | 70 | 295 | 4000 | >300 |
| 3 | 200 | 2.77 | 125 | 270 | 2100 | >400 |
| 4 | 240 | 1.78 | 135 | 180 | 3300 | >300 |
| 5 | 200 | 1.33 | 150 | 235 | 2100 | >400 |
| 6 | 200 | 0.67 | 300 | 160 | 2500 | >400 |
| 7 | 185 | 0.57 | 325 | 140 | 2000 | >250 |
| 8 | 200 | 2.24 | 90 | 240 | 2100 | >300 |

It is ascertained in Table II that, for all the profiles of the inventive compensating fibers, chromatic dispersion at 1550 nm varies from 180 to 315 ps/nm/km and that the DOS is greater than 40 nm. A small portion of the inventive fiber can therefore induce high dispersion with a DOS that is equivalent to that of a SSMF-type or NZDSF-type fiber. Therefore, when overcompensation is inserted in a line section, offset compensation may be achieved with a small length of the inventive fiber, for example rolled in a module at the entry to a node or receiver.

Figure 4:
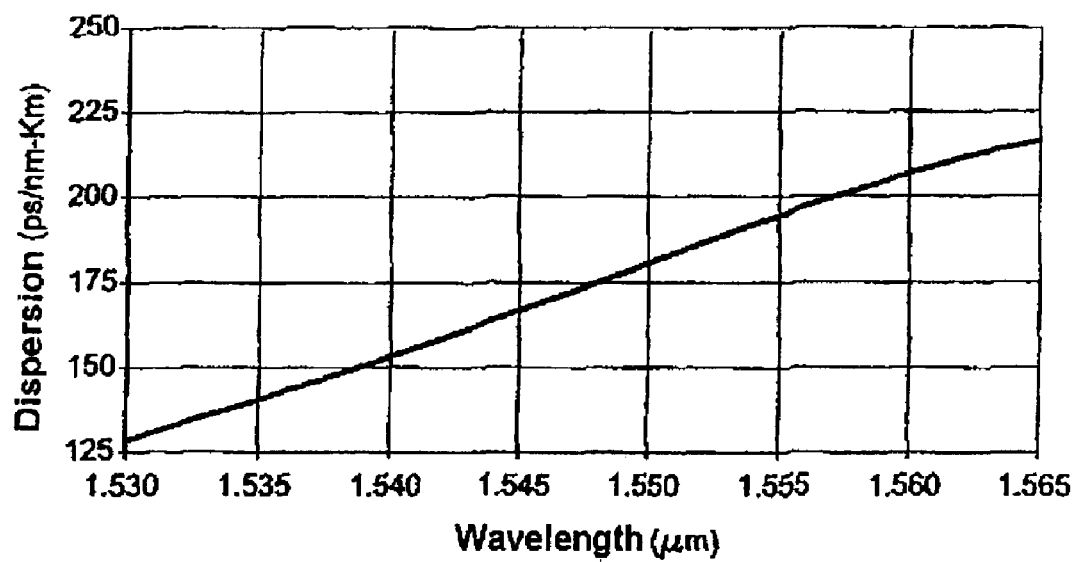
Figure 6:
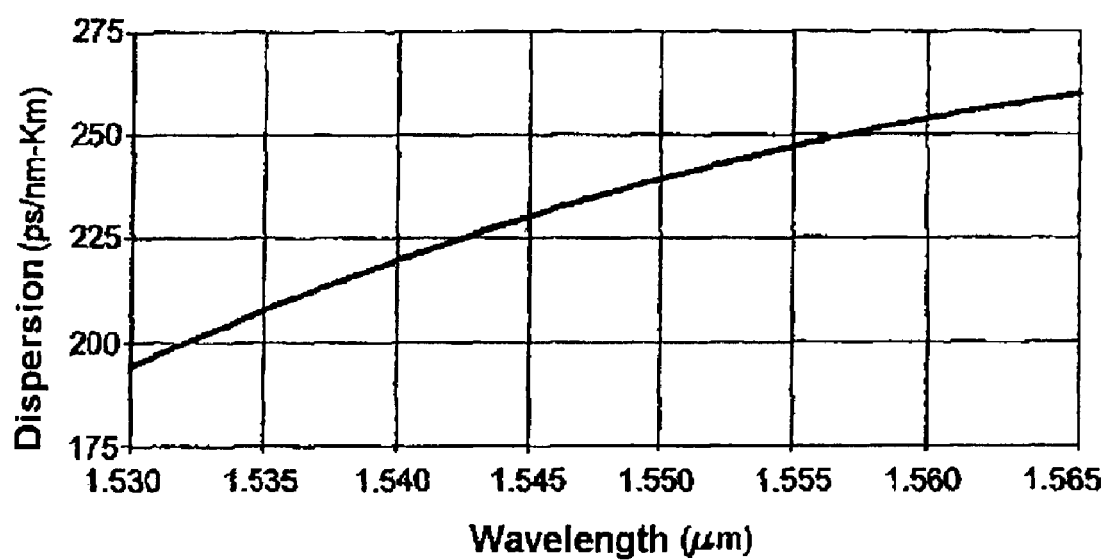
Figure 8:
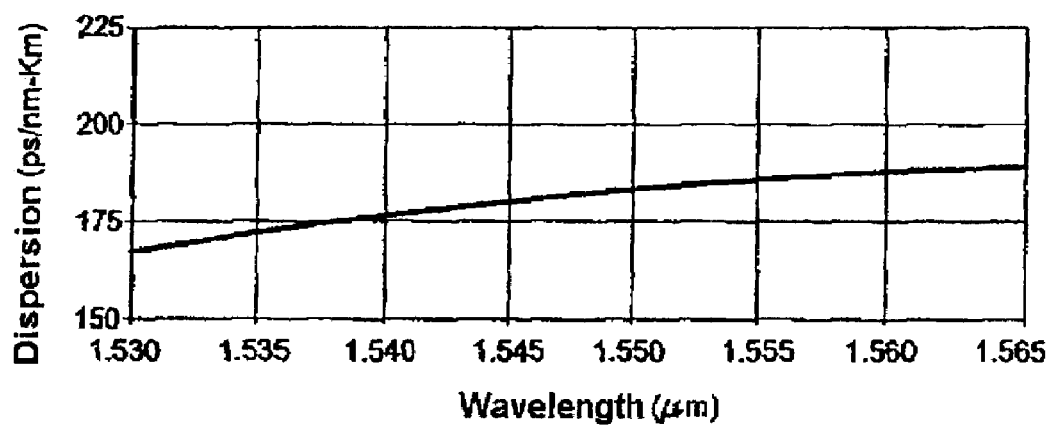

It is also ascertained that the chromatic dispersion slope D' is positive at the wavelength of 1550 nm. In addition, FIGS. 4, 6 and 8 show chromatic dispersion over the entire C band for examples 1, 4 and 7 in Table I. It is found that the chromatic dispersion slope indeed remains positive over the entire spectral band under consideration.

It is also ascertained in Table II that the effective surface area $A_{\it{eff}}$ of the inventive compensating fiber is greater than 140 µm² with a Figure of Merit of more than 250 ps/nm/dB, and even often more than 300 ps/nm/dB. The inventive compensating fiber therefore has an effective surface area $A_{\it{eff}}$ that is markedly higher than that of a SSMF or PSCF (which is in the order of 80 µm²) which provides improved countering of non-linear effects. The FOM is also two to three times greater than the FOM of a SSMF or PSCF. It is also seen in this Table II that for all the profiles, the effective cut-off wavelength for propagation mode $LP_{02}$ lies between 2000 nm and 4000 nm; at the considered wavelengths, the signal therefore indeed propagates in the inventive fiber according to $LP_{02}$ mode.

The inventive compensating fiber is intended to be used in a chromatic dispersion compensating module for a long haul, high bit-rate transmission system having a plurality of transmission line sections.

Figure 2:
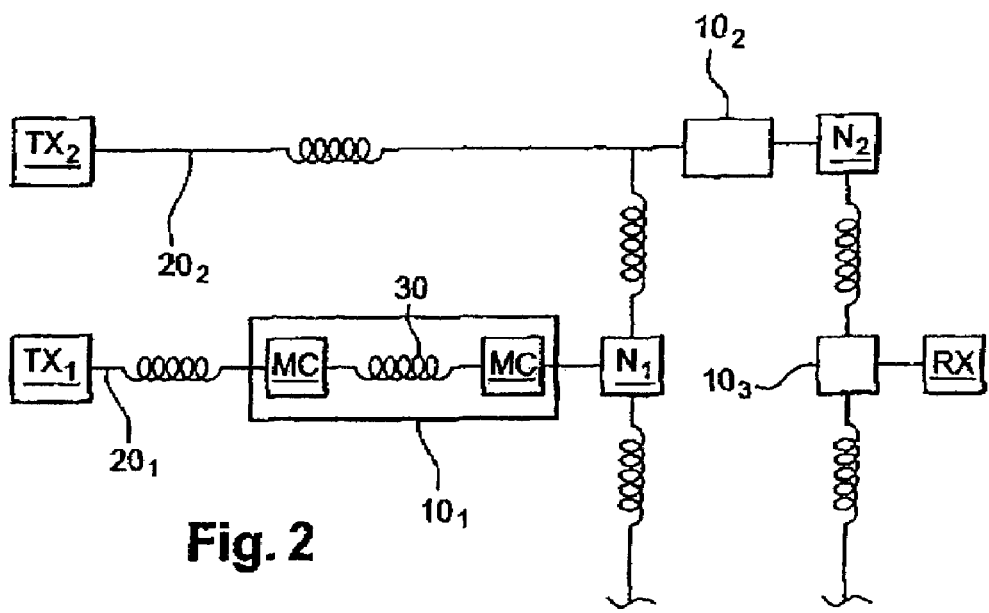
FIG. 2, a schematic showing an optical transmission system of the invention, FIG. 3, a graph of the set profile of a dispersion compensating fiber according to a first example of embodiment of the invention, FIG. 4, a curve showing the chromatic dispersion on band C of the fiber in FIG. 3.

Said transmission system is illustrated FIG. 2. The system of the invention comprises at least one transmitter of optical signals Tx1, Tx2 to transmit optical signals wavelength-multiplexed in a predetermined spectral band, the C band for example. The transmitted signals propagate in fundamental mode $LP_{01}$ along the optical transmission line sections $20_1$, $20_2$. As previously defined, a line section 20 comprises at least one line fiber section, a SMF for example, having positive chromatic dispersion and positive chromatic dispersion slope, and at least one section of dispersion compensating fiber DCF exhibiting negative chromatic dispersion and negative chromatic dispersion slope.

An optical system may simply link an optical transmitter Tx to an optical receiver Rx and/or have a plurality of nodes $N_1$, $N_2$ grouping together several line sections 20. The nodes of the optical system may comprise optical amplifiers and signal reshaping components as well as multiplexers to distribute the received signals towards other transmission line sections 20. At the entry of an optical receiver Rx or node $N_1$, $N_2$, the optical signal must have a cumulated chromatic dispersion and a cumulated chromatic dispersion slope that are close to zero.

For this purpose, the optical transmission system of the invention has a dispersion overcompensation module $10_1$, $10_2$, $10_3$ at the entry of each node $N_1$, $N_2$ or receiver Rx. The inventive system proposes inserting overcompensation in all or some of the line sections 20 in order to reduce non-linear effects. A given line section may therefore exhibit negative cumulated chromatic dispersion and negative cumulated chromatic dispersion slope; it is then necessary to offset this overcompensation to arrive at zero at the entry of the receiver or optical node.

The overcompensation module 10 of the invention has a first mode converter MC to convert the fundamental mode $LP_{01}$ of the signal arriving from the transmission line section 20 into a higher order mode, $LP_{02}$ for example. The higher order mode signal then propagates in a fiber section 30 of the invention. The inventive overcompensation module 10 also has a second mode converter MC to convert the higher order mode into fundamental mode to re-insert the signal in another line section 20 or in a receiver. The first and second mode converters may be obtained using any known technology, for example Long Period Gratings or spatial light modulators.

The inventive fiber 3 may be rolled between two mode converters MC in a casing of the overcompensation module 10. For this purpose, the profile of the inventive fiber is such that the fiber exhibits reduced curve losses which have no impact on optical losses of the module 10.

Also, to limit optical loses and polarization effects in module 10, it is preferred to use a high order mode having the same symmetry as the fundamental mode $LP_{01}$, i.e. all high order modes with circular symmetry.

A Figure of Merit (FOM) for the module can therefore be defined as the ratio of cumulated chromatic dispersion by the inventive fiber section placed in the module, over global optical losses; these losses include optical losses induced by said fiber section, by the mode converters and connectors. The inventive module has a relatively high FOM value of 150 ps/nm/dB or over for cumulated chromatic dispersion in the fiber of more than 800 ps/nm.

With the inventive fiber, it is therefore possible to obtain a dispersion compensating module allowing effective offsetting of overcompensation in a transmission line section over the entire spectral band under consideration. An optical system can therefore be considered in which dispersion management promotes overcompensation to reduce non-linear effects, which are particularly high when the transmission rate increases. Compensating modules according to the invention are distributed within the system to offset the effects of overcompensation and to optimize the optical transmission system.

The invention claimed is:

1. A multimode fiber having an index profile such that, for a propagation mode other than the fundamental mode and at a wavelength of 1550 nm, said fiber presents:
 a positive chromatic dispersion greater than or equal to 50 ps/nm/km;
 a positive chromatic dispersion slope;

a figure of merit (FOM) greater than or equal to 200 ps/nm/dB; and for a high order propagation mode and at a wavelength of 1550 nm, an effective area greater or equal to 100 µm$^2$.

2. The fiber of claim 1, having for a high order propagation mode and at a wavelength of 1550 nm, a dispersion over slope ratio (DOS) being greater than or equal to 40 nm.

3. The fiber of claim 1, having for a high order propagation mode and at a wavelength of 1550 nm, a positive chromatic dispersion being greater than or equal to 150 ps/nm/km.

4. The fiber of claim 1, having for a high order propagation mode, a positive chromatic dispersion slope over an entire chosen spectral band.

5. The fiber of claim 4, wherein the chosen spectral band is the C-Band, the L-Band, the S-Band or the U-Band.

6. The fiber of claim 1, having for the $LP_{02}$ mode an effective cut-off wavelength being greater than 2000 nm.

7. A chromatic dispersion compensating module adapted to offset an overcompensation of an optical signal propagating in a fundamental mode in a transmission line section comprising a line fiber with positive chromatic dispersion and positive chromatic dispersion slope, the module comprising:

a first mode converter adapted to convert the fundamental mode into a higher mode;

a section of the multimode fiber according to claim 1;

a second mode converter adapted to convert the higher mode into the fundamental mode.

8. The module of claim 7, wherein the dispersion over slope ratio (DOS) of the multimode fiber is substantially equal to the dispersion over slope ratio (DOS) of the transmission line fiber.

9. The module of claim 7, wherein the higher mode and the fundamental mode have a same symmetry.

10. The module of claim 7, having a figure of merit (FOM) greater than or equal to 150 ps/nm/dB for a cumulated chromatic dispersion in the fiber section greater than or equal to 800 ps/nm.

11. An optical transmission system comprising:

at least one optical transmitter emitting optical signals in a predetermined spectral band;

at least one section of transmission line having negative cumulated chromatic dispersion and negative cumulated chromatic dispersion slope;

at least one module according to claim 7 positioned at one end of a transmission line section.

12. The system of claim 11, wherein the transmission line section comprises at least one line fiber section with positive chromatic dispersion and positive chromatic dispersion slope and at least one section of dispersion compensating fiber section having negative chromatic dispersion and negative chromatic dispersion slope.

* * * * *